United States Patent [19]

Bernard

[11] 3,999,575
[45] Dec. 28, 1976

[54] CONTROL VALVE

[75] Inventor: James A. Bernard, Dayton, Ohio

[73] Assignee: General Motors Corporation, Detroit, Mich.

[22] Filed: Oct. 28, 1975

[21] Appl. No.: 625,921

[52] U.S. Cl. .................. 137/807; 137/13; 137/251

[51] Int. Cl.² ..................... F16K 9/00; F16K 31/06

[58] Field of Search ............... 137/1, 251, 807, 13; 251/139, 65; 138/45

[56] References Cited

UNITED STATES PATENTS

| | | | |
|---|---|---|---|
| 2,869,818 | 1/1959 | Fleuret | 137/251 X |
| 3,405,728 | 10/1968 | Dexter | 137/251 |
| 3,485,254 | 12/1969 | Ernst | 137/807 |
| 3,552,275 | 1/1971 | Chancy et al. | 137/251 X |
| 3,587,613 | 6/1971 | Mark | 138/45 |

*Primary Examiner*—William R. Cline
*Attorney, Agent, or Firm*—K. H. MacLean, Jr.

[57] ABSTRACT

A refrigerant control valve for an air conditioning system in which a flow passage is formed between closely spaced poles of an electro-magnet which may be selectively magnetized by energizing a coil to produce a magnetic field through the pole members and across the flow passage. This attracts a quantity of small iron particles which are mixed with and circulate with the refrigerant and lubricating oil. The accumulation of iron particles on the surfaces of the pole members decreases the flow area between the poles and controls refrigerant flow.

3 Claims, 5 Drawing Figures

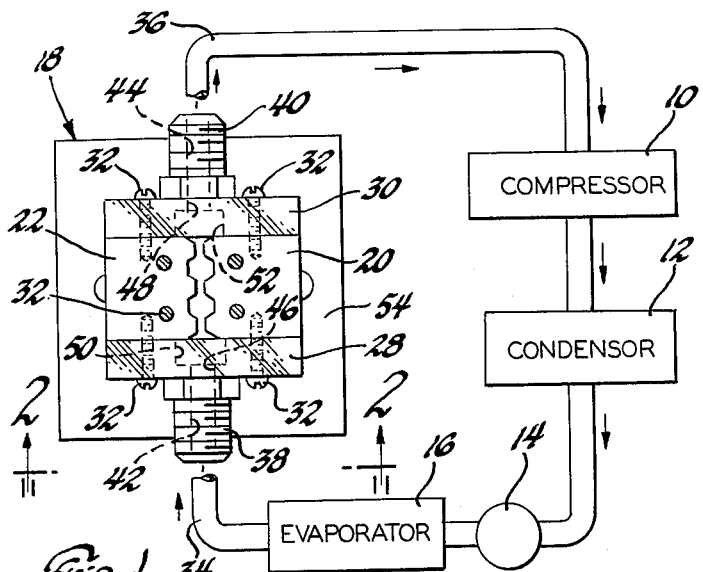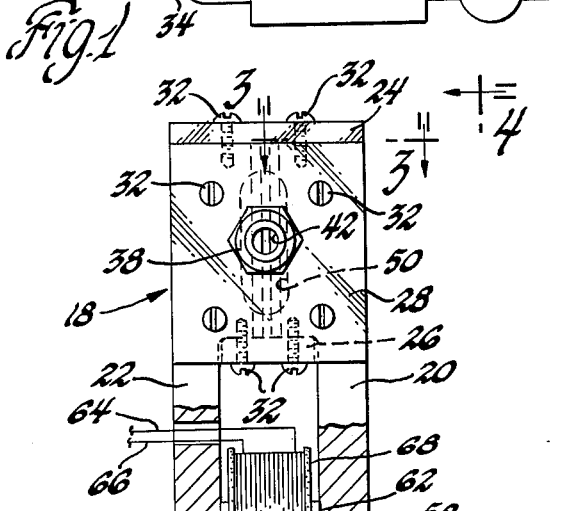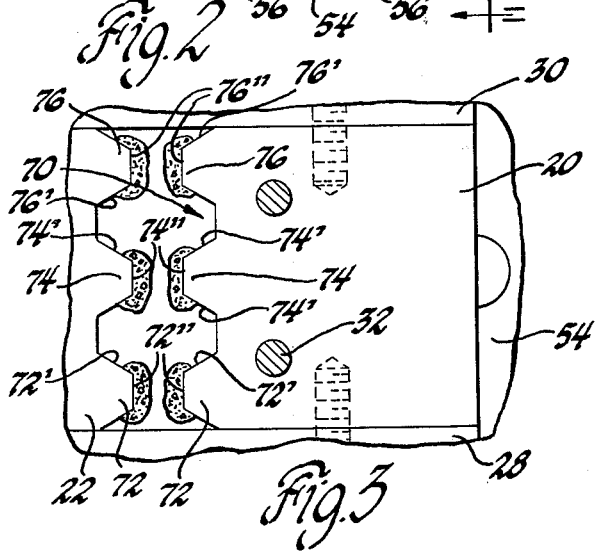

CONTROL VALVE

This invention relates to a refrigerant control valve for an air conditioning system or the like and more particularly to a valve in which fluid flows through a passge formed between the poles of an electromagnet. The flow area is controlled by changing the strength of the magnetic field which causes quantities of fine iron particles to collect about the poles and in the path of fluid flow to create a restriction.

Refrigerant systems in general and particularly automotive air conditioning systems have used expensive and relatively complex flow control valves to regulate refrigerant flow. Specifically, it is necessary to employ a throttling type flow control valve between the evaporator and the compressor to maintain refrigerant pressure in the evaporator above a level corresponding to freezing temperatures of the evaporator external surfaces. This prevents frost formation thereon which is undesirable. Prior throttling valves have utilized pressure or temperature responsive actuators to control movement of a valve member. The resultant throttling action or restriction caused by valve movement maintains sufficient evaporator pressure.

The aforedescribed throttling valves and also expansion valves which control refrigerant flow to the evaporator both utilize a relatively great number of parts. In addition, some of the parts including the valve member are movable. This amounts to a complex assembly whose utility is affected by valve sticking or any other mechanical problem. Replacement of these valves requires discharging the refrigerant and latter refilling of the system, which involves a substantial expense.

The subject control valve has only a few parts none of which are movable. The valve is therefore a relatively inexpensive item. Because moving parts are eliminated, the valve components cannot stick or jam. Specifically, the subject valve includes pole members of magnetic material, such as iron, which extend in parallelism and are spaced to form a gap at one end. The pole members are interconnected at the other end by a tie member, also of magnetic material. The adjacent surfaces of the pole members on either side of the gap defines the flow passage through the valve. The passage is further defined by side and top and bottom members. A coil of wire is supported between the pole members adjacent the tie member which produces a magnetic field when DC current flows through the coil.

Opposite sides of the flow gap formed by portions of the pole members are magnetized to form North-South poles. The magnetic poles tend to attract loose magnetic material to the surface of the pole members. In conjunction with the aforedescribed valve, a quantity of finely divided iron particles is added to the refrigerant and lubricating oil. These iron particles are attracted to and held against the surfaces of the magnetic poles in the path of fluid flow through the gap. This accumulation of iron particles decreases the flow area and would be effective as a suction throttling valve control. If used as an expansion valve control, the voltage might be adjusted to provide the desired flow into the evaporator according to the particular operating conditions prevailing. Numerous temperature responsive controls are available which could be used to regulate coil current in the desirable manner. When the subject valve is used as a throttling valve to prevent evaporator freezeup, the current or voltage control might be achieved by a simple pressure responsive device or by an external temperature sensor.

In a preferred embodiment illustrated and described hereinafter, a plurality of ridges which are separated by grooves or valleys are formed in the pole members on either side of the gap. The ridges extend normal to and across the flow passage and are aligned with corresponding ridges on the other pole member to form a series of narrow gaps through which fluid flows. The formation of multiple restrictions in the valve provides a more effective (stronger) and reliable flow control valve.

Therefore, an object of the invention is to provide an inexpensive and yet reliable valve for fluid flow control in which control is achieved by varying the flow area by the accumulation of small iron particles in response to energization of the coil of an electromagnet.

A still further object of the invention is to provide a versatile and reliable valve for controlling fluid flow in which control is achieved by the production of a restriction in the fluid flow path caused by an accumulation of small iron particles in response to energization of the coil of an electromagnet.

A still further object of the invention is to provide a valve for fluid control including forming a fluid passage between poles of an electromagnet with the surfaces of the pole members formed with successive ridges and depressions aligned with one another across the passage to form a series of closely spaced restrictions. The flow is made more restrictive by energization of a coil to produce a magnetic field and resultantly attract small iron particles to the ridge portions.

Further objects and advantages of the present invention will be more readily apparent from the following detailed description reference being had to the accompanying drawings in which a preferred embodiment is illustrated.

FIG. 1 is a somewhat schematic view of an automotive air conditioning system including the subject control valve;

FIG. 2 is a view of the control valve looking in the directions of the arrows 2—2 in FIG. 1 and partially broken away;

FIG. 3 is an enlarged fragmentary view of the pole members taken along section line 3—3 in FIG. 2;

FIG. 4 is a view of the valve looking in the directions of the arrows 4—4 in FIG. 2; and FIG. 5 is a perspective view of one of the pole members.

In FIG. 1 of the drawings, an automotive air conditioning circuit is shown including in fluid flow relation a compressor 10, a condensor 12, a receiver-dehydrator 14, a restrictor to decrease refrigerant pressure which may be within the conduit 15 between the members 14 and 16, an evaporator 16, and a suction flow control valve 18 located between the evaporator and the compressor. The control valve 18 is so placed to regulate the quantity of refrigerant which is evacuated from the evaporator by the compressor. During certain periods of operation, the capacity of the compressor to pump refrigerant and evacuate the evaporator may exceed the supply of vaporized refrigerant in the evaporator caused by "boiling" which resultantly will cause the evaporator pressure to decrease. To avoid decreasing evaporator pressure below a level corresponding to freezing temperatures, the valve 18 limits the flow of refrigerant out of the evaporator and thus evaporator pressure is maintained above a freezing level. This prevents frost from accumulating on the evaporator air surfaces.

The aforementioned freeze producing conditions occur typically when the air conditioning system is operated in a relatively low ambient temperature environment, say 70° F. Running the compressor at medium to high speeds on a highway trip produces excess pumping capacity wih respect to the quantity of vaporous refrigerant produced by heat extraction by the evaporator. This amount of heat absorbed by the evaporator is generally limited by the difference in temperature between air passing therethrough and the refrigerant, as well as the configuration and size of the evaporator. Thus, in a low ambient temperature environment, less heat is absorbed and the quantity of vaporous refrigerant to be removed from the evaporator by the compressor decreases.

Heretofore, a throttling valve has been employed between the evaporator and the compressor to restrict the discharge flow of refrigerant from the evaporator in response to evaporator pressure conditions. The subject control valve performs this throttling function and has very desirable characteristics for use in an air conditioning system as well as in other fluid control systems.

The control valve 18 shown in the drawings includes a flow passage formed between the first ends of two magnetic pole members 20 and 22 and between top and bottom housing members 24, 26 and sides 28, 30. In the particular embodiment shown, the members 24, 26, 28 and 30 are fastened in a fluid-tight manner to the pole members 20 and 22 by fasteners 32. The two side members 28, 30 have fluid passage means therethrough as explained hereinafter adapted to be connected to the conduit 34 connected to the evaporator outlet and to the suction conduit 36 connected to the compressor inlet. Fittings 38, 40 having fluid passages 42, 44 therein permit fluid flow from the evaporator through the control valve and to the compressor. Passages 46, 48 in the end members 28, 30 connect with elongated grooves or channels 50, 52 in members 28, 30. Fluid passes from the channel 50 through the space between the pole members 20 and 22 to the channel 52.

The spacing between opposing faces or surfaces of the pole members 20, 22 is determined to provide sufficient flow from the evaporator to the compressor for predetermined adequate cooling of a passenger compartment of a vehicle during operation in high ambient temperatures. Thus the flow passage between the pole pieces represents the fully opened operative position of the control valve.

The pole pieces 20, 22 have lower second end portions which extend in substantial parallelism into contact with non-magnetic tie member or bar 54 which is attached by fasteners 56. In the space between the lower portions a coil of relatively fine wire is supported by fasteners 58 thus forming an electromagnetic coil and core assembly 60. Specifically, the fasteners 58 extend through the pole pieces 20 and 22 and into the ends of a mandrel member 62 of soft iron or low carbon steel material. The wire has leads represented by numerals 64, 66 and is turned around a nylon spool 68 to form multiple loops.

In the embodiment illustrated in the drawings, the mandrel 62 has a diameter of about 0.75 inches and is surrounded by a spool of about 2 inches. Approximately 700 turns or 115 feet of No. 24 copper wire with a thin coating of insulation thereon was utilized. The pole pieces 20, 22 are all made of soft iron or low carbon steel. The top and bottom members 24, 26 and end members 28, 30 were made of clear lucite so that operation of the valve could be observed. The use of lucite is obviously not essential to the invention and other non-magnetic material could be substituted. Iron or low carbon steel forms a good path for conduction of a magnetic field but there are obviously other materials which might be used.

By applying a voltage to the leads 64, 66 of the coil assembly 60, current flows through the coil wire which produces a magnetic field extending through the pole pieces 20, 22. Because of the spacing between the upper ends of the pole members 20 and 22, the magnetic field extends through the space or gap between the pole members which is also the fluid passage. The intensity of the magnetic field or the flux density may be changed by increasing or decreasing the voltage applied to the coil 60. When the coil assembly 60 is energized, the resultant magnetic field causes the spaced upper ends of the pole members to form North and South poles of a magnet on either side of the flow passage. The polarity of lead 64 or 66 is not critical except that it affects the relative designation of the pole members as North and South.

The control valve 18 operates to restrict fluid flow between the evaporator and the compressor when the coil assembly 60 is energized. The fluid restriction is caused by the attraction to the pole members of tiny iron particles which are thoroughly mixed with and carried by a fluid or refrigerant and oil flowing through the valve. These iron particles are characterized by extremely small dimensions in the order of approximately 100 angstroms. Obviously in an automotive air conditioning system having up to 5 pounds of refrigerant, the number of iron particles would be extremely large. The iron particles are carried with the refrigerant and lubricating oil throughout the air conditioning system and are so small that they do not interfere with nor create any appreciable wear of metal surfaces such as in the compressor. A source for these magnetic particles is the Ferrofluidics Corporation of Burlington, Mass.

In the preferred embodiment of the control valve as shown in the drawings and particularly in FIGS. 3 and 5, the pole members 20, 22 have an enlarged upper end portion with a surface 70 of irregular configuration. The surface 70 has three raised ridges 72, 74, 76, each separated by a depression or valley portion 78. The ridges illustrated in the drawings have side surfaces 72', 74', 76' inclined 30° with respect to the plane extending normal to the flow passage. The peak surfaces 72'', 74'', 76'', have a width of about 0.125 inches. The spacing between opposite peak surfaces was about 0.095 inches. Both pole members 20 and 22 are alike so that when placed side by side in parallelism as shown in FIG. 2, the ridges on both members will be aligned across the flow passage so as to create a series of three successive gaps or narrow spaces therebetween through which fluid must flow.

As illustrated in FIG. 3, energization of the magnetic coil assembly 60 imposes a magnetic field across the three gaps between the ridges 72, 74 and 76 which attracts and holds an accumulation of iron particles. The magnetic flux density is concentrated at the vicinity of the ridges 72, 74 and 76 since the distance between the two poles is closest at these points. The magnetic field attracts the aforedescribed tiny iron particles from the refrigerant and holds them about the ends or peaks of the ridge. This reduces the flow area through the control valve and thus there will be a corresponding decrease in flow rate and increase in the internal pressure of the evaporator connected to the inlet of the valve.

It is even possible to apply sufficient voltage to the coil to produce a magnetic field with sufficient strength to cause the corresponding buildup of iron particles on the opposing ridges to join together. At this level of operation, fluid flow will be completely cut off and this represents the closed operative position.

The embodiment of the invention previously discussed and shown in the drawings has been tested satisfactorily. The test utilized to measure the efficiency of the valve is called an air pressure test. A quantity of iron particles is first introduced to the ridge area and a predetermined voltage then applied to the coil. An increasing air pressure is applied to the inlet of the valve until flow is initiated through the valve. Various readings are taken at different voltage levels and it is found that with the particular configuration illustrated and described, the valve will repeatedly hold air pressures of 60–75 psi at about 12 volts. This level is in excess of the need for a throttling valve.

Although the embodiment illustrated is a preferred embodiment, other embodiments may be contemplated which still fall within the scope of the following claims which define the invention.

What is claimed is:

1. A flow control valve for a fluid having a quantity of small magnetizable particles mixed therewith comprising: a housing including two spaced members of magnetizable material and enclosure members of nonmagnetizable material attached thereto which together define a fluid flow passage between said spaced members; inlet and outlet means for directing fluid flow from one side of said housing to another side between said magnetizable members; at least one ridge formation on each of said spaced members aligned across said flow passage to define a narrow control gap between which fluid must flow from said inlet to said outlet; selectively energizable means to cause a magnetic field to extend between said two spaced members whereby the closeness of aligned ridge portions concentrates the magnetic field thereabout and creates localized poles thereof which attracts and maintain a quantity of magnetizable particles tending to narrow said control gap and restrict fluid flow corresponding generally to the degree of energization.

2. A valve for controlling the flow of a fluid of the type having a quantity of small iron particles mixed therewith comprising: a pair of spaced pole members made of easily magnetized material with first end portions and second end portions; a tie bar fastened between the second end portions of said pole members and thereby supporting said pole members to closely space surfaces on said first end portions with respect to each other to thus form a flow passage therebetween; wall means of non-magnetic material engaging said first end portions and enclosing said flow passage; inlet means for introducing fluid to one side of said passage and outlet means for discharging fluid from the opposite side of said passage after flow between said closely spaced surfaces; means for selectively producing a magnetic field through said pole members and across said flow passage; ridges formed on each of said spaced surfaces extending normal to fluid flow and aligned with corresponding ridges on the adjacent surface to form a narrow gap through which fluid flows whereby the aligned ridges concentrate the magnetic flux to attract a quantity of the small iron particles about said ridges thereby narrowing said passage and restricting flow.

3. A valve for controlling the flow of a fluid of the type having a quantity of small iron particles mixed therewith comprising: a pair of spaced pole members made of easily magnetized material such as iron with first end portions and second end portions; a tie bar member fastened to said second end portions thus supporting said elongated pole members in substantial parallelism and to closely space surfaces on said first end portions with respect to each other to form a flow passage therebetween; wall means of non-magnetic material engaging said first end portions and enclosing said flow passage; inlet means for introducing fluid to one side of said passage and outlet means for discharging fluid from the opposite side of said passage after flow between said closely spaced surfaces; means for selectively producing a magnetic field in said pole members including a coil of conductive wire with a plurality of turns about a mandrel of easily magnetizable material supported between said pole members whereby the magnetic field extends across said flow passage when a voltage is applied to said coil; said closely spaced surfaces on said first end portions being nonplanar with alternate ridges and depressions extending normal to fluid flow in said passage with corresponding ridge portions on opposite end portions of the pole members being aligned to form a series of narrow gaps through which fluid passes between said inlet and said outlet whereby the aligned ridges on said surfaces concentrate the magnetic flux to attract a quantity of small iron particles about said ridges thereby narrowing said passage and restricting fluid flow.

\* \* \* \* \*